(12) United States Patent
Goodall et al.

(10) Patent No.: US 12,026,069 B2
(45) Date of Patent: *Jul. 2, 2024

(54) DATA STORAGE VOLUME RECOVERY MANAGEMENT

(71) Applicant: INTERNATIONAL BUSINESS MACHINES CORPORATION, Armonk, NY (US)

(72) Inventors: Lourie Goodall, Tucson, AZ (US); Erika Dawson, Tucson, AZ (US); Joseph M. Swingler, Phoenix, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,541

(22) Filed: Sep. 2, 2022

(65) Prior Publication Data

US 2022/0413973 A1    Dec. 29, 2022

Related U.S. Application Data

(63) Continuation of application No. 17/031,276, filed on Sep. 24, 2020, now Pat. No. 11,461,193.

(51) Int. Cl.
  *G06F 11/14*  (2006.01)
  *G06F 3/06*   (2006.01)

(52) U.S. Cl.
  CPC ........ *G06F 11/1469* (2013.01); *G06F 3/0617* (2013.01); *G06F 11/1451* (2013.01)

(58) Field of Classification Search
  CPC .................................................. G06F 11/1451
  See application file for complete search history.

(56) References Cited

U.S. PATENT DOCUMENTS

| 6,513,101 B1 | 1/2003 | Fisher et al. |
| 6,703,228 B1 * | 3/2004 | Landers ................. C12Q 1/686 |
| | | 536/24.31 |

(Continued)

FOREIGN PATENT DOCUMENTS

| CN | 103336728 A | 10/2013 |
| CN | 104216796 A | 12/2014 |
| CN | 108038026 A | 5/2018 |

OTHER PUBLICATIONS

Notice of Acceptance for Patent Application dated Aug. 3, 2023, 3 pp., for Application No 2021348394.

(Continued)

*Primary Examiner* — Eliyah S. Harper
(74) *Attorney, Agent, or Firm* — KONRAD, RAYNES, DAVDA & VICTOR LLP; William K. Konrad

(57) ABSTRACT

Provided are a computer program product, system and method for restoring volumes in a data storage system. A virtual restoration of a volume of data stored in storage is performed using a target volume. In one embodiment, the virtual restoration includes configuring metadata associated with the target volume, to map the target volume to the recover volume as a virtual restoration of the recover volume. In response to a request by a host for data stored on the recover volume, physical restoration of data of the recover volume is performed using the target volume. In one embodiment, the physical restoration includes transferring data to the target volume from the recover volume to which the target volume is mapped by the virtual restoration. In addition, transferred data is relabeled as target volume data instead of recover volume data.

25 Claims, 9 Drawing Sheets

(56) References Cited

U.S. PATENT DOCUMENTS

| | | | |
|---|---|---|---|
| 7,020,755 B2 | 3/2006 | Gibble et al. | |
| 7,292,944 B2* | 11/2007 | Larder | G01N 33/5091 |
| | | | 702/19 |
| 7,478,216 B2 | 1/2009 | Carlson et al. | |
| 7,630,986 B1* | 12/2009 | Herz | G06Q 30/0603 |
| | | | 707/999.009 |
| 7,783,665 B1* | 8/2010 | Tormasov | G06F 16/176 |
| | | | 713/165 |
| 7,818,396 B2* | 10/2010 | Dolin | G06Q 30/02 |
| | | | 709/219 |
| 8,463,554 B2* | 6/2013 | Hon | G06N 5/048 |
| | | | 707/700 |
| 8,589,437 B1* | 11/2013 | Khomenko | G16B 50/30 |
| | | | 707/941 |
| 8,595,430 B2 | 11/2013 | Iwasaki et al. | |
| 8,738,871 B1* | 5/2014 | Naftel | G06F 11/1469 |
| | | | 711/162 |
| 8,898,021 B2* | 11/2014 | Perlin | G06F 16/22 |
| | | | 702/22 |
| 9,552,370 B1 | 1/2017 | McCloskey et al. | |
| 10,152,492 B1 | 12/2018 | Abdulla | |
| 10,521,132 B1 | 12/2019 | Scott et al. | |
| 11,366,682 B1 | 6/2022 | Krasilnikov et al. | |
| 2002/0095585 A1* | 7/2002 | Scott | G06Q 10/10 |
| | | | 713/185 |
| 2002/0187496 A1* | 12/2002 | Andersson | G16B 50/00 |
| | | | 435/6.14 |
| 2004/0044855 A1 | 3/2004 | Carlson et al. | |
| 2005/0152905 A1* | 7/2005 | Omoigui | A61K 38/1793 |
| | | | 514/420 |
| 2007/0166728 A1* | 7/2007 | Abramson | G16B 20/20 |
| | | | 702/20 |
| 2007/0198485 A1* | 8/2007 | Ramer | G06F 16/9535 |
| 2007/0226250 A1* | 9/2007 | Mueller | G06Q 30/04 |
| | | | 707/999.102 |
| 2007/0299851 A1* | 12/2007 | Kalbfleisch | G06Q 10/10 |
| 2008/0009268 A1* | 1/2008 | Ramer | H04L 67/53 |
| | | | 707/E17.109 |
| 2008/0131887 A1* | 6/2008 | Stephan | G16B 20/20 |
| | | | 707/999.01 |
| 2008/0228797 A1* | 9/2008 | Kenedy | G06F 16/951 |
| 2009/0043752 A1* | 2/2009 | Kenedy | G06Q 50/00 |
| | | | 707/999.005 |
| 2009/0077110 A1* | 3/2009 | Petri | G06F 16/958 |
| | | | 707/999.102 |
| 2009/0099789 A1* | 4/2009 | Stephan | G16B 20/00 |
| | | | 702/19 |
| 2009/0119083 A1* | 5/2009 | Avey | G16B 20/40 |
| | | | 703/11 |
| 2010/0042438 A1* | 2/2010 | Moore | G16B 20/10 |
| | | | 705/3 |
| 2010/0070455 A1* | 3/2010 | Halperin | G16B 20/20 |
| | | | 706/54 |
| 2014/0181395 A1 | 6/2014 | Vincent et al. | |
| 2015/0324145 A1 | 11/2015 | Akutsu et al. | |
| 2016/0085645 A1 | 3/2016 | Buzzard et al. | |
| 2017/0153833 A1 | 6/2017 | Iwasaki et al. | |
| 2018/0095833 A1 | 4/2018 | Slater et al. | |
| 2018/0293136 A1 | 10/2018 | Pomykaj | |
| 2019/0339896 A1 | 11/2019 | McCloskey et al. | |
| 2020/0042607 A1 | 2/2020 | Mitsuma et al. | |
| 2020/0050687 A1 | 2/2020 | Kaushik et al. | |
| 2020/0142627 A1 | 5/2020 | Kucherov et al. | |
| 2022/0091944 A1 | 3/2022 | Goodall et al. | |
| 2022/0092036 A1 | 3/2022 | Goodall et al. | |

OTHER PUBLICATIONS

Coyne, L., et al., "IBM TS7700 Release 4.2 Guide", IBM Redbook, Apr. 2019, 988 pp.

Coyne, L., et al., "IBM TS7700 Release 5.0 Guide", IBM Redbook, Mar. 2020, 984 pp.

Dell, Inc., "Dell EMC Disk Library for Mainframe", Version 5.0, Rev. 04, Feb. 2020, 162 pp.

VMS Software, "VSI Archive Backup System for OpenVMS Guide to Operations", Feb. 2019, 278 pp.

International Search Report and Written Opinion for International Application No. PCT/CN2021/118734, dated Dec. 17, 2021, 10 pp. [18.929PCT (ISR WO)].

List of Patents or Patent Applications Treated as Related, dated Sep. 2022, pp. 2.

Broadcom, "TMSCLEAN Utility—List Scratch, Clean and Scratch Inventory Volumes", Last Updated Jun. 25, 2020 [Retrieved on Sep. 14, 2020], Retrieved from the Internet <URL: https://techdocs.broadcom.com/content/broadcom/techdocs/us/en/ca-mainframe-software/performance-and-storage/ca-1-tape-management-system/14-0/utilities-and-reports/tmsclean-utility-list-scratch-clean-and-scratch-inventory-volumes.html>, 13 pp.

Notice of Allowance dated Jul. 13, 2022, pp. 21, for U.S. Appl. No. 17/031,276.

* cited by examiner

| TAPE LIBRARY CATALOG PRIOR TO INITIATION OF VIRTUAL RECOVERY PROCESS | | | |
|---|---|---|---|
| Volume Serial No. | Volume Version | Volume State | Volume Category |
| L00000 | V1 | Active | C000 |
| L00000 | V2 | Retain | C000 |
| S99999 | – | Scratch | 0002 |

FIG. 7A

| TAPE LIBRARY CATALOG UPON INITIATION OF VIRTUAL RECOVERY PROCESS | | | |
|---|---|---|---|
| Volume Serial No. | Volume Version | Volume State | Volume Category |
| L00000 | V1 | Active | C000 |
| L00000 | V2 | Retain | C000 |
| S99999 | -V1 | HOLD | Y000 |

FIG. 7B

| TAPE LIBRARY CATALOG DURING VIRTUAL RECOVERY PROCESS | | | |
|---|---|---|---|
| Volume Serial No. | Volume Version | Volume State | Volume Category |
| L00000 | V1 | Active | C000 |
| L00000 | V2 | Retain | C000 |
| S99999 | -V1 | Private | C000 |

FIG. 7C

| TAPE LIBRARY CATALOG DURING VIRTUAL RECOVERY PROCESS | | | |
|---|---|---|---|
| Volume Serial No. | Volume Version | Volume State | Volume Category |
| L00000 | V1 | Active | C000 |
| L00000 | V2 | HOLD | C000 |
| S99999 | -V1 | Private | C000 |

FIG. 7D

| TAPE LIBRARY CATALOG UPON INITIATION OF PHYSICAL RECOVERY PROCESS | | | |
|---|---|---|---|
| Volume Serial No. | Volume Version | Volume State | Volume Category |
| L00000 | V1 | Active | C000 |
| L00000 | V2 | HOLD | C000 |
| S99999 | -V1 | Mount | C000 |

FIG. 7E

| TAPE LIBRARY CATALOG UPON COMPLETION OF COPYING FOR PHYSICAL RECOVERY PROCESS | | | |
|---|---|---|---|
| Volume Serial No. | Volume Version | Volume State | Volume Category |
| L00000 | V1 | Active | C000 |
| L00000 | V2 | HOLD | C000 |
| S99999 | -V1 | Active | C000 |

FIG. 7F

| TAPE LIBRARY CATALOG UPON COMPLETION OF RECOVERY PROCESS | | | |
|---|---|---|---|
| Volume Serial No. | Volume Version | Volume State | Volume Category |
| L00000 | V1 | Active | C000 |
| L00000 | V2 | Retain | C000 |
| S99999 | -V1 | Active | C000 |

FIG. 7G

| VTS MAPPING CATALOG FOR VIRTUAL RECOVERY PROCESS | | | |
|---|---|---|---|
| Target Scratch Volume Serial No. | Target Scratch Volume Version | Recover Volume Serial No. | Recover Volume Version |
| S99999 | -V1 | L00000 | V2 |
| | | | |
| | | | |

FIG. 8A

| Host MCATALOG FOR VIRTUAL RECOVERY PROCESS | | | |
|---|---|---|---|
| Target Scratch Volume Serial No. | Replaced Recover Volume Serial No. | | |
| S99999 | L00000 | | |
| | | | |
| | | | |

FIG. 8B

DATA STORAGE VOLUME RECOVERY MANAGEMENT

CROSS-REFERENCE TO RELATED APPLICATION

This application is a continuation of U.S. patent application Ser. No. 17/031,276, filed Sep. 24, 2020, which application is incorporated herein by reference in its entirety.

BACKGROUND

The present invention relates to a computer program product, system, and method for managing recovery of a volume in a data storage system.

Various storage devices have been utilized for long term storage of data. For example, data can be stored on magnetic tape. The collection of such tapes is often referred to as a tape library and data is written to and read from the tapes using a tape drive. The magnetic tape may be carried in a cartridge, for example, and mounted in a tape drive by robots when needed. When mounted in the tape drive, the tape of the cartridge is transported past a read/write head of the tape drive to allow data to be written to or read from the tape of the cartridge.

Mainframe hosts and storage controllers communicate with long-term storage devices using tape protocols. In virtual tape, Virtual Tape Servers (VTS) emulate tape devices. The International Business Machines Corporation's TS7700 is one such VTS that emulates a tape library with tape drives. A mainframe host views the TS7700 as a tape library. Thus, a virtual tape server such as the TS7700 appears to a mainframe host and communicates with the mainframe host as if it were a tape library. However, instead of dealing with physical tape cartridges, a virtual tape server works with logical volumes which may be thought of as virtual tape volumes. In the same manner as a tape cartridge, each logical volume is assigned a VOLSER (volume serial number) and a version number identifying the particular version of that volume serial number.

Tape libraries of a tape storage device typically contain a range of empty tape cartridges that are ready to store data. A mainframe host catalogs these tape volumes by their VOLSER to keep track of which tape volumes are available, which tape volumes contain data and what the content of that data is. As a result, when a particular data set is needed, the mainframe knows which tape volume identified by its VOLSER to mount from the tape library in order to retrieve the particular data set from storage. Once the data stored on a tape volume is no longer needed, the tape volume may be placed in a "scratch" category for the tape volume and its associated VOLSER to be reused.

In a known tape storage device, a storage manager also catalogs and manages these tape volumes by their VOLSER. Unlike the mainframe host, the storage manager logic of the tape storage device does not know the content of a tape volume identified by a VOLSER but keeps track of where in the tape library the particular tape volume having that VOLSER is stored and how it should manage the tape volume having that VOLSER (e.g. how long to retain it after its been deleted, how many copies to maintain, where to make those copies, etc.).

A single tape cartridge (VOLSER) can store a large amount of data so the host typically bundles a large amount of data together before writing to the tape. A VOLSER can contain multiple data sets (potentially thousands of data sets). A virtual tape server, such as the TS7700, may also retain the VOLSER for a time period specified by a host user even after the mainframe host has reclaimed the active data and marked the VOLSER as deleted. This practice is used in case of accidental or malicious activity where someone marks the VOLSER for delete in the host prematurely. In a TS7700, this is called Category Retention. A user can set a retention period from hours to years on any volume with data. However, the data contained in the VOLSER will eventually be deleted.

Whether a physical tape volume or a logical volume of a virtual tape server, on occasion the need arises to restore or recover a volume. For example, an older version of a volume may have been deleted but later it is discovered that the particular version of the volume is still needed. For this reason it may be desirable to retain older versions of data. Logical volume version changes occur when all of the data on it is no longer valid or any active data was moved to another logical volume due to a RECLAIM process. These volumes would be scratched and picked back up to be reused for new data writes. Logical volume versions may also change when the data is appended to. In this case, the same VOLSER continues to be used but the version level changes. In any of these cases, the older version of the data could be retained for some amount of time based on user needs, in case an older version of a logical volume needs to be restored or recovered.

One known recovery process (also referred to as a restoration process) restores the older version of the logical volume into a volume having the same VOLSER identification (ID) as the deleted volume. However, should the volume of that VOLSER contain current valid data and also have a "hold" property assigned to it by a retention policy, restoring the volume to the same VOLSER would violate a hold property which requires the volume to be held without modification for a mandatory hold period. Similarly, if the VOLSER of the volume to be restored has been categorized as an LWORM volume (Logical Write Once, Read Many), allowing this older version to be restored to the same VOLSER violates these strict protection rules.

Another known approach restores an older version of a volume into a different, scratch VOLSER. However these known restoration methods, require the volume to be physically copied or moved into the scratch volume before the volume is considered 'restored'. Such physical copying or data movement typically requires the volume to be read from storage, the read data modified, and then written back to the storage device. For example, data read from the volume being restored is typically re-labeled by updating metadata to match the VOLSER to which it is being restored. Thus, any metadata describing a file or contained within a file which references the VOLSER, is updated to name the new VOLSER instead of the old VOLSER. However, modification of the data of the volume being restored may violate legal restrictions on the volume which prohibit modification or replacement of the data. Also, the data of a volume marked as read-only such as WORM (Write Once, Read Many), cannot be modified or replaced without violating the read-only restriction.

SUMMARY

Provided are a computer program product, system and method for restoring a volume of data in storage. A virtual restoration of a first volume of data stored in the storage is performed using a second volume. In one embodiment, the metadata associated with the second volume is configured to map the second volume to the first volume as a virtual restoration of the first volume. In another aspect, in response to a request by a host for data stored on the first volume, a physical restoration of data of the first volume is performed using the second volume. In one embodiment, the physical restoration includes transferring data to the second volume from the first volume to which the second volume is mapped by the virtual restoration. In addition, transferred data is relabeled as second volume data instead of first volume data.

With the above embodiment, accessing data of the first volume is deferred until access to the data is requested by the host. As a result, rapid and low cost restoration in a virtual restoration is facilitated. Furthermore, modification of data on the first volume in association with restoration of the first volume may be avoided during virtual and physical restoration of the first volume. Accordingly, restoration may be achieved notwithstanding any restrictions on modification of data of the first volume.

In another embodiment, transferring data to the second volume from the first volume includes receiving a request by the host to mount the second volume on a storage drive and in response to the request: mounting the second volume on a storage drive, mounting the first volume on a storage drive, and copying data of the first volume mapped to the second volume by the metadata for the second volume.

With the above embodiment, mounting the first volume to access data of the first volume is deferred until mounting of the second volume is requested by the host. As a result, the virtual restoration facilitates rapid and low cost restoration of the first volume until it is mounted for a requested physical restoration. Furthermore, modification of data on the first volume in association with restoration of the first volume may be avoided during virtual and physical restoration of the first volume since the data is relabeled on the second volume and not on the first volume during the physical restoration. Accordingly, restoration may be achieved notwithstanding any restrictions on modification of data of the first volume.

In a further embodiment, relabeling transferred data as second volume data instead of first volume data includes modifying header data read from the first volume as data is stored on the second volume to identify data copied from the first volume as being data for the second volume instead of the first volume and so that modifying header data read from the first volume is deferred until access to the data is requested by the host.

With the above embodiment, relabeling data is deferred until mounting of the second volume is requested by the host. As a result, the virtual restoration facilitates rapid and low cost restoration of the first volume until data is relabeled for a requested physical restoration. In addition, modification of header data on the first volume in association with restoration of the first volume may be avoided during virtual and physical restoration of the first volume. Instead, header data on the second volume is modified to relabel user data transferred to the second volume and is not modified on the first volume during the physical restoration.

In a further embodiment, the first volume has a first volume serial number and the second volume has a second serial number different from the first volume serial number. Modifying header data for storing on the second volume during the physical restoration of the first volume includes replacing the first serial number of the first volume in header data, with the second volume serial number of the second volume, as header data and user data are read from the first volume and read data is copied to the second volume.

With the above embodiment, relabeling data with the serial number of the second volume is deferred until mounting of the second volume to request data of the first volume is requested by the host. As a result, the virtual restoration facilitates rapid and low cost restoration of the first volume until data is relabeled with a different serial number for a requested physical restoration. In addition, modification of the serial number in header data on the first volume in association with restoration of the first volume may be avoided during virtual and physical restoration of the first volume. Instead, serial number header data on the second volume is modified to relabel user data transferred to the second volume and is not modified on the first volume during the physical restoration.

In another embodiment, the first volume is categorized as a read-only volume prior to mounting the first volume to prevent modification of the first volume by the restoration of the first volume during both the virtual restoration and physical restoration of the first volume.

With the above embodiment, the second volume may be categorized as read-only to ensure compliance with legal or policy restrictions on the second volume because both the virtual restoration and the physical restoration may be carried out without any modification to the data of the second volume. Accordingly, restoration may be achieved notwithstanding any restrictions on modification of data of the first volume.

In yet another embodiment, prior to initiation of the virtual restoration of the first volume, the first volume is categorized in a retain category in which volumes are retained for a period of time after being designated for deletion. The virtual restoration of the first volume further includes re-categorizing the first volume in a hold category in which modification of volumes is prevented. In response to completion of the transferring data from the first volume to the second volume during the physical restoration of the first volume, the first volume is re-categorized from the hold category back to the retain category.

With the above embodiment, modification of the first volume by the restoration of the first volume may be avoided during both the virtual restoration and the physical restoration of the first volume. Accordingly, the first volume may be re-categorized in a hold category to ensure that modification of the first volume is prevented. Thus, restoration may be achieved notwithstanding any restrictions on modification of data of the first volume.

In still another embodiment, at least one policy is assigned to the second volume in which the policy defines parameters for at least one of how long to keep a volume and a permitted number of versions of the volume. With this embodiment, virtual restoration may be facilitated.

In another embodiment, a third volume is imported to the storage wherein the importing includes performing a virtual restoration of the third volume using a fourth volume having a volume serial number which conforms to a volume serial numbering convention of the storage. The virtual restoration of the third volume includes configuring metadata associated with the fourth volume to map the fourth volume to the third volume as a virtual restoration of the third volume.

With the above embodiment, accessing data of the third volume is deferred during importation until access to the data is requested by the host. As a result, rapid and low cost importation is facilitated. Furthermore, modification of data on the third volume in association with importation of the third volume may be avoided. Accordingly, importation may be achieved notwithstanding any restrictions on modification of data of the third volume.

In still another embodiment, the second volume is deleted and a second virtual restoration of the first volume is performed using a third volume. The second virtual restoration includes configuring metadata associated with the third volume to map the third volume to the first volume as a second virtual restoration of the first volume.

With the above embodiment, the first volume remains immutable over the course of the first and second virtual restorations of the first volume. As a result, the first volume may be restored recursively again and again as appropriate, remaining immutable in each restoration.

In another embodiment, the first volume is stored in secondary storage coupled to a storage server having primary storage. The first volume remains unmounted in the secondary storage throughout the virtual restoration of the first volume.

With the above embodiment, because mounting the first volume to access data of the first volume is deferred until mounting of the second volume is requested by the host, the first volume may remain unaccessed in secondary storage during the virtual restoration, avoiding the expense of transferring data from the first volume in secondary storage in connection with the virtual restoration.

BRIEF DESCRIPTION OF THE DRAWINGS

FIGS. 7A-7G depict embodiments of catalog entries of a tape library of a VTS at various stages of the virtual and physical recovery processes of FIGS. 6A-6B.

FIG. 8A is an embodiment of a catalog entry of a VTS depicting a mapping of a target scratch volume to a recover volume for the virtual recovery process of FIGS. 5A and 6.

FIG. 8B is an embodiment of a catalog entry of a host depicting a mapping of a target scratch volume to a recover volume for the virtual recovery process of FIGS. 5A and 6.

DETAILED DESCRIPTION

Figure 1:
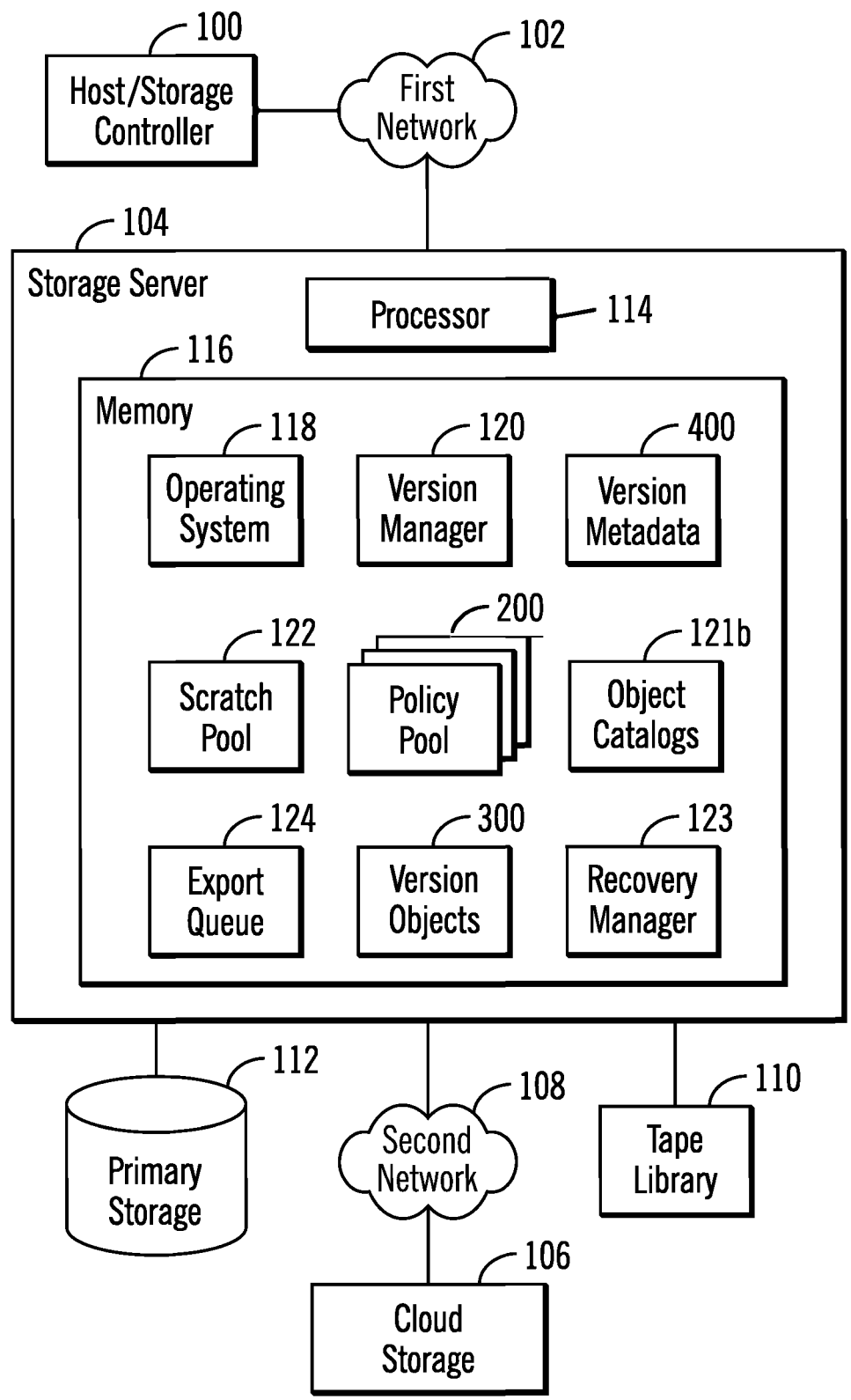
FIG. 1 illustrates an embodiment of a storage environment employing data storage volume recovery management in accordance with the present description.

Data storage volume recovery management in accordance with the present description provides a significant improvement to computer technology. In one aspect of data storage recovery management in accordance with the present description, recovery of a data storage volume includes a virtual recovery or restoration which configures metadata associated with the volumes to map a target scratch volume to a recover volume. In this manner, the virtual recovery may be completed without copying or other transferring of data from a recover volume to the target scratch volume. Configuring metadata may be accomplished in a fraction of a second in some instances whereas copying of gigabytes of data can take on the order of an hour or more in many cases. As a result, the virtual recovery may be completed significantly more quickly, using significantly fewer computational or manpower resources, as compared to various known recovery methods. Furthermore, the virtual recovery may be completed without modifying the recover volume itself in any manner, and thus without mounting the recover volume at all. As a result, the recover volume can remain immutable to satisfy various retention policy or legal requirements that the recover volume remain unchanged. Still further, the virtual recovery permits the significant costs often associated with copying or moving data to be avoided as long as the data is not actually needed for purposes other than recovery.

It is appreciated herein that access to the data of a recover volume is frequently not needed immediately or even long term. As a result, a virtual recovery as described herein may frequently meet immediate or even long term needs in connection with volume recovery in which a need for actual access to the data of the recover volume does not arise or has not yet arisen. However, in those instances in which a need for access to the data of a recover volume should become apparent at some point after virtual recovery of the volume has been completed, data recovery management in accordance with the present description also provides a second recovery process, that is, a physical restoration or recovery process which provides ready access to the data of a recover volume which has already completed the virtual recovery process.

In one embodiment, the physical recovery process includes copying data from the recover volume to the target volume which may be referred to as a private volume instead of a scratch volume at this stage. Thus, any mounting of the recover volume to copy data from the recover volume to the target private volume is deferred until the need for the data actually arises to provide in effect, an "on-demand" data transfer, obviating data transfer during the virtual recovery process. As noted above, eliminating data transfer for the virtual recovery facilitates rapid completion of the virtual recovery process. Accordingly, time-consuming and resource consuming data transfer is deferred until a need for the data actually arises and the physical recovery is then implemented.

In another aspect of a physical recovery process in accordance with the present description, as the data is copied from the recover volume to the target private volume in connection with the physical recovery process, the copied data is relabeled in the target private volume to indicate that the copied data now belongs to the VOLSER of the target private volume instead of the VOLSER of the recover volume from which it was read. This relabeling of the data is thus also deferred until after the virtual recovery process and is deferred to when the physical recovery is implemented where a need for accessing the data has arisen. In this manner, relabeling of the copied data is in effect an "on-demand" data relabeling of the physical recovery process, obviating any need for data relabeling during the virtual recovery process. Here too, the physical recovery may be completed without modifying the recover volume in any manner. As a result, the recover volume can remain immutable to satisfy various retention policy or legal requirements that the recover volume remain unchanged.

In another aspect of data storage volume recovery management in accordance with the present description, the virtual recovery process may be used to quickly and efficiently import volumes from another source which may have a different or conflicting volume serial numbering scheme or convention. In one embodiment, the volumes to be imported may be mapped or remapped to new VOLSERs which conform to the existing volume serial number convention of the target data storage system for example. Thus, the volumes to be imported may be mapped or remapped to new VOLSERs which do not match existing active VOLSERS or otherwise conflict with existing VOLSERS of the host or VTS, for example, of a target data storage system. In addition, the volumes being imported may be mapped or remapped to VOLSERs which conform to and thereby maintain existing volume serial number range conventions.

It is appreciated that volumes to be imported to a target VTS, for example, may number in the hundreds, thousands, millions or more, depending upon the particular application. The virtual recovery process of the illustrated embodiment, allows large numbers of volumes to be rapidly imported to a target VTS without mounting or otherwise accessing any of the volumes being imported with the virtual recovery process. As a result, the volumes being imported may be hardened to maintain the validity of their contents knowing each imported volume can remain immutable and is only relabeled on-demand as part of any future mount request of a later physical recovery. For example, for legal reasons, the state of the data at import time may require it remain immutable to maintain a consistent point of workload acquisition. Virtual recovery process of the illustrated embodiment permits importation of volumes without volume serial (VOLSER) conflict, without needing to access each instance and without needing to modify the source instance. Should a need arise to access data of an imported volume, an on-demand physical recovery of the imported volume may be performed as described above.

FIG. 1 illustrates an embodiment of a data storage environment having one or more host systems and/or storage controllers 100 that provide data for an object or volume in the form of a reclaim volume or an append to an object over a first network 102 to a storage server 104. An "object" as that term is used herein may comprise a volume, a data set, database, logical drive, file system and any other grouping of data. The storage server 104 may generate objects, such as backup volumes or tape volumes, to backup in one or more of a cloud storage 106 over a second network 108, (which can be on-site or off-site with respect to the storage server 104), a tape library 110 to store on physical tape cartridges, and on primary storage 112 of the 15 storage server 104. Further, the version backup objects may be stored in the primary storage 112 permanently or temporarily as well as transferred to cloud or tape storage. The storage server 104 may generate version objects 300 of backup objects for different versions that have a unique serial number, such as a VOLSER, and includes standard tape marks and data blocks.

The storage server 104 includes a processor 114 and a memory 116 including programs executed by the processor 114 to create version objects 300 of an object in a format, such as a tape format, to store in one or more of a tape library 110, cloud storage 106 and primary storage 112. The memory 116 includes an operating system 118 to manage storage server 104 operations and a version manager 120 to create and manage object versions 300, such as tape volumes, to store in one or more of the tape library 110, the remote storage 106 and primary storage 112. A recovery manager 123 manages recovery of a volume in a virtual recovery process and in an on-demand physical recovery process as described in greater detail below.

Figure 1A:
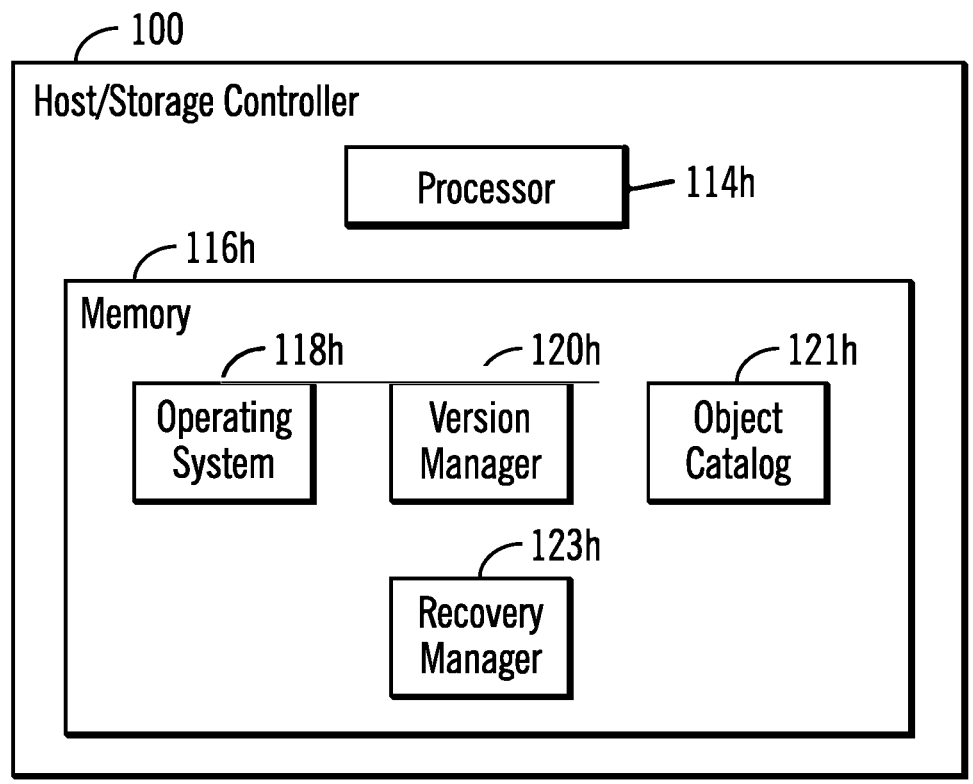
FIG. 1A illustrates an embodiment of a host such as a storage controller, for example, employing data storage volume recovery management in accordance with the present description.

Referring to FIG. 1A, a host 100 includes a processor 114$h$ (FIG. 1A) and a memory 116$h$ including programs executed by the processor 114$h$, to provide data for an object or volume to the storage server 104. The memory 116$h$ includes an operating system 118$h$ to manage host 100 operations and a version manager 120$h$ to provide data for an object or volume to the storage server 104. In addition, the version manager 120$h$ issues commands to the storage server 104 for the management of object versions 300, such as tape volumes, stored in one or more of the tape library 110, the remote storage 106 and primary storage 112. The version manager 120$h$ maintains metadata identifying various characteristics of the objects stored in or by the storage server 104 in the form of catalogs 121$h$. A recovery manager 123$h$ issues commands to the storage server 104 for the recovery of object versions 300, such as tape volumes, stored in one or more of the tape library 110, the remote storage 106 and primary storage 112.

Referring back to FIG. 1, the storage server 104 (FIG. 1) may obtain a serial number from a scratch pool 122, such as a volume serial number (VOLSER), to use for an object version 300 to create and store in one or more of the tape library 110, the remote storage 106 and primary storage 112. All versions of an object/volume would use the same serial number or VOLSER. A tape volume serial number or VOLSER is used to uniquely identify a tape volume. For tape storage, the VOLSER is specified in the tape label, which is the first set of information contained on the tape. In addition to the tape label, other metadata stored internally within the tape volume also identifies the VOL SER of the volume.

The version manager 120 may further generate version metadata 400 having metadata on the version objects 300 that may be used to restore the data for a version object 300 from version objects 300 of a higher version number. In addition, the version manager 120 processes commands from the host 100 for the management of object versions 300, such as tape volumes, stored in one or more of the tape library 110, the remote storage 106 and primary storage 112. The version manager 120 of the storage server 104 also maintains metadata identifying various characteristics of the objects stored in or by the storage server 104 in the form of catalogs 121$b$.

The serial number or VOLSER obtained from the scratch pool 122 may be assigned to a policy pool 200, where different policy pools 200 maintain different data retention policies. Upon creating an instance of an object version 300$_i$ to write to storage, such as 106, 112 or 110, the version manager 120 may add indication of the object version 300$_i$ to an export queue 124 to export the object version 300$_i$ to storage 112, 110, 106.

In one embodiment, the storage server 104 may comprise a virtual tape server to manage the creation of versions of objects to offload to storage 110, 112, such as, by way of example, the International Business Machines Corporations (IBM) TS7700 virtual tape server. A virtual server emulates a tape library with tape drives to the connected hosts/storage controllers 100. The storage server 104 may provide archival of objects for storage in one or more of a lower cost physical tape library 110, cloud storage 106 and primary storage 112.

The program components in the memory 116, including 118, 120, 123 are shown in FIG. 1 as program code loaded into the memory 116 and executed by the processor 114. Similarly, the program components in the memory 116$h$, including 118$h$, 120$h$, 123$h$ are shown in FIG. 1A as program code loaded into the memory 116$h$ and executed by the processor 114$h$. Alternatively, some or all of the components functions may be implemented in hardware devices, such as in Application Specific Integrated Circuits (ASICs), Field Programmable Gate Array (FPGA) or executed by separate dedicated processors.

The memory 116, 116$h$ may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

The version manager 120 may export object versions 300 to one or more of the tape library 110, the remote storage 106 and primary storage 112 over a network. For example, FIG. 1 depicts the storage server 104 coupled to the remote cloud storage 106 over a second network 108. In an alternative embodiment, the cloud storage 106 may be local such as on the same premises as the storage server 104, for example, The cloud storage 106 may comprise a cloud storage system provided by a cloud storage service provider. Examples of cloud storage 106 service providers include DropBox®, Google® Drive, Amazon Cloud Drive®, Amazon® S3, IBM® Cloud Object Storage System™, etc. (Dropbox is a registered trademark of Dropbox, Inc., Google is a registered trademark of Google, Inc., Amazon and Amazon Cloud Drive are trademarks of Amazon Technologies, Inc.; and IBM and Cloud Object Storage System are trademarks of IBM throughout the world).

The version manager 120 may use the primary storage 112 as a virtual tape cache to store object versions 300 being created and before they are added to the export queue 124 to migrate to storage 106, 110, 112. In further embodiments, the primary storage 112 may be used to store the object versions 300 if there is no available storage 106, 110, 112.

The primary storage 112 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in the primary storage 112 may further be configured from an array of devices, such as Just a Bunch of Disks (JBOD), Direct Access Storage Device (DASD), Redundant Array of Independent Disks (RAID) array, virtualization device, etc. Further, the storage 112 may comprise heterogeneous storage devices from different vendors and different types of storage devices, such as a first type of storage devices, e.g., hard disk drives, that have a slower data transfer rate than a second type of storage devices, e.g., SSDs. The cloud storage 106 and the tape library 110 may be considered as secondary storage as compared to the primary storage 112.

The first network 102 used by a host/storage controller 100 to communicate volume data to storage server 104 may comprise a storage network such as one or more interconnected Local Area Networks (LAN), Storage Area Networks (SAN), Wide Area Network (WAN), peer-to-peer network, wireless network, etc. The second network 108 may comprise a network accessible to remote storage such as a cloud storage 106, such as the Internet, a Wide Area Network (WAN). In alternative embodiments, the first 102 and second 108 networks may be the same network and one or more of the primary storage 112 and the tape library 110 may also be remote storage accessible over a network.

Figure 2:
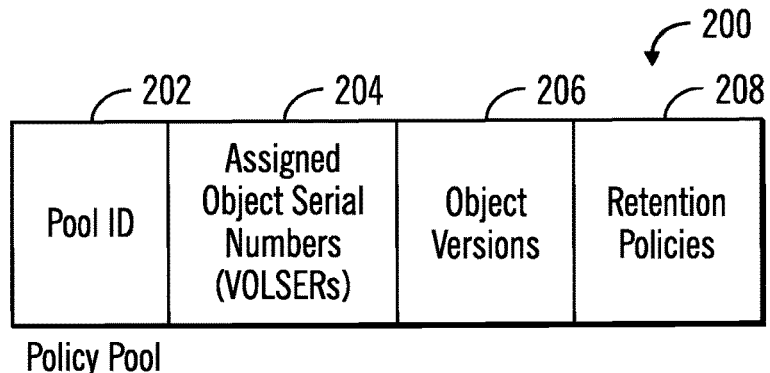
FIG. 2 illustrates an embodiment of a policy pool defining retention polices.

FIG. 2 illustrates an embodiment of a an instance 200$i$ of a policy pool 200 to which an object serial number, e.g., VOLSER, is assigned for an object or volume to write, and includes a pool identifier 202 identifying the pool, the assigned object serial numbers (VOLSERs) 204 assigned to the pool, the object versions 206 included in the pool for the object serial numbers 204, and one or more retention policies 208 to determine how long to retain object versions in a policy pool 200.

Examples of retention policies include:
 a maximum number of previous version to retain, including version metadata 400$_i$ and version object 300$_i$ data for a version.
 a maximum number of days to retain previous version information, including version metadata 400$_i$ and version object 300$_i$ data for an object.
 a maximum number of previous versions for which version object 300$_i$ data is retained.
 a retain every kth version of an object, such that data for a version object 300$_i$ is retained if a version number of the version object 300$_i$ is a multiple of k plus 1, e.g., is the version number of the object=1+x*k, where x is an integer greater than zero.

Figure 3:
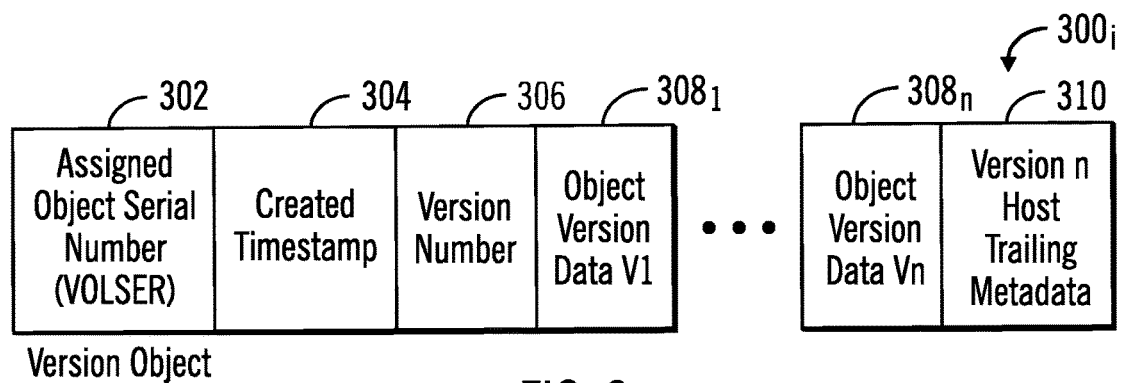
FIG. 3 illustrates an embodiment of a version object having actual data for a version of an object.

FIG. 3 illustrates an instance 300' of a version object being created from object or volume data sent from the hosts/storage controllers 100, and includes: an object serial number, e.g., VOLSER, assigned to the object/volume for which versions are created; a created timestamp 304 when the object version was created; a version number 306 of the object; one or more instances of object version data $308_1$ . . . $308_n$ for each version of object data for versions $V_1$ to $V_n$ from the host/storage controller 100 included to the version object 300$_i$, including recently appended data; and host trailing metadata 312 added to the end of an object version by the host/storage controller 100 that created the object version sent to the storage server 104. The host trailing metadata 312 may include information on the structure and format of the object and on the host/storage controller 100 that generated the data in the object.

Figure 4:
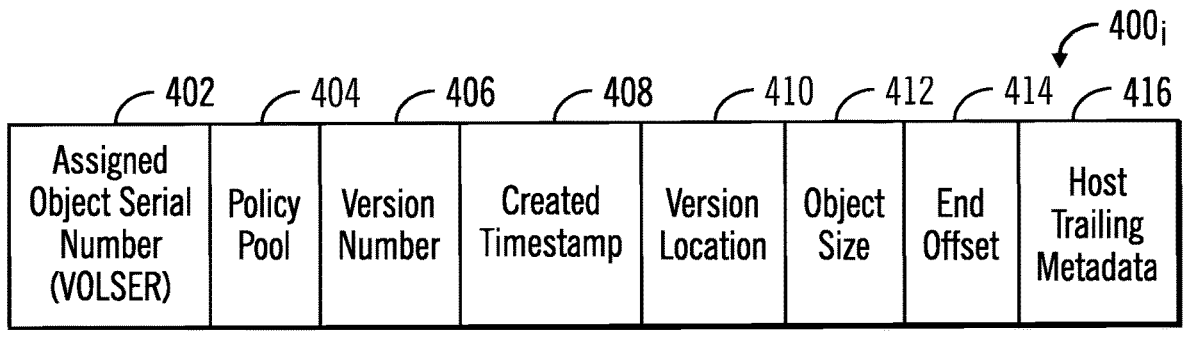
FIG. 4 illustrates an embodiment of version metadata having metadata on a version object.

FIG. 4 illustrate an instance 400$_i$ of version metadata 400 having metadata on a version object 300$_i$, which may be maintained separate from the version object 300$_i$ and be retained if the version object 300$_i$ for a prior version is deleted to conserve space. The version metadata 400$_i$ instance may include an assigned object serial number, e.g., VOLSER, 402; a policy pool 404 in which the object and serial number 402 are assigned; a version number 406 of the version object; a created timestamp 408 when the version object 300$_i$ was created; a version location 410 indicating one or more version objects 300$_j$ of a higher version that include the data for the version number 406; an object size 412 of the object 300$_i$ represented by the version metadata 400$_i$; an end offset 414 indicating where the version object ends if the data for the version object is included in a subsequent version object 300$_j$ at which the appended data for the version number 406 ends; and host trailing metadata 416 having information added by the host/storage controller 100 providing the object data and that is located at an end of the version object $300_i$. The host trailing metadata 312 is saved in the version metadata $400_i$ as 416 because the host trailing metadata 312 for version number 406 may be overwritten when new data and changes are appended. This allows the version object $300_i$ to be restored with its original host trailing metadata 312.

The version metadata $400_i$ maintains any other information needed to identify the start and end of a version of data.

The version manager 120 maintains the version metadata 400 until a retention policy determines an end of a version retention period to expire and delete the version metadata 400 as well as version objects 300 having the actual data for the objects. The version metadata 400 may be used to identify and access for restoration any of the versions identified in the version metadata 400 from a current version or higher version number object 300. Thus if a particular version of a volume has been marked by a user for deletion, the data of that volume version may nonetheless be accessed for restoration into a private volume by a physical recovery process as described herein as long as the retention period defined by the retention policy assigned that version of the deleted volume has not expired. Accordingly, if the version metadata 400 identifying that volume version and the version object 300 having the actual data for the object still exist, the data of the deleted volume may be accessed for restoration to a new volume by the physical recovery process. However, once the version metadata 400 version metadata 400 identifying that volume version and the version object 300 having the actual data for the object have been discarded in accordance with the applicable retention policy, the deleted volume may not be recovered.

Although volume recovery management is described herein in connection with volumes stored as objects 300 with associated metadata 400 which provide improved efficiency in usage of storage space, it is appreciated that volume recovery management in accordance with the present description may be utilized in data storage systems utilizing other data and metadata storage techniques. For example, volume recovery management in accordance with the present description may be utilized in data storage systems in which each version of a volume is stored and retained in its entirety as a separate unit until discarded by expiration of a policy retention period.

As set forth above, volume recovery management in accordance with the present description provides a virtual recovery process which provides for restoration of a volume without requiring mounting or any modification of the recovery volume. In addition a physical recovery process provides an "on-demand" relabeling of data copied to the target private volume until the data of the recover volume is actually accessed.

Figure 5A:
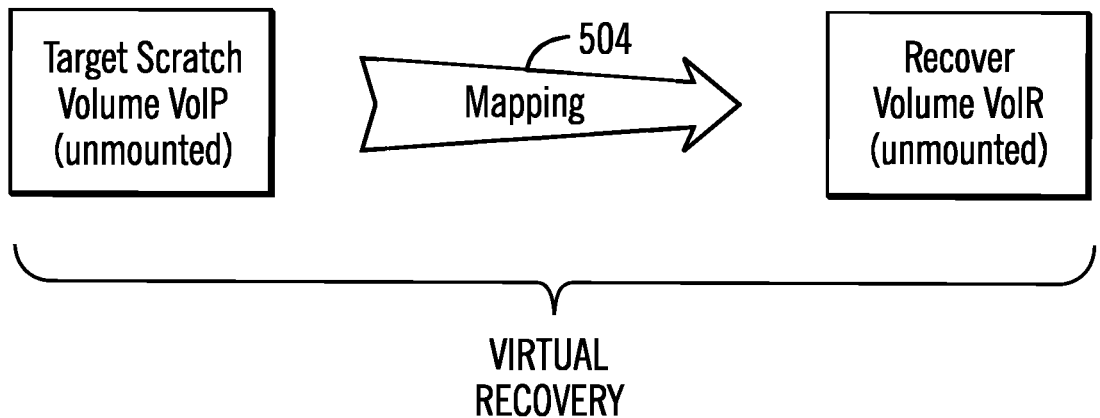
FIG. 5A illustrates an embodiment of operations of a virtual restoration or recovery process employing data storage volume recovery management in accordance with the present description.
Figure 6A:
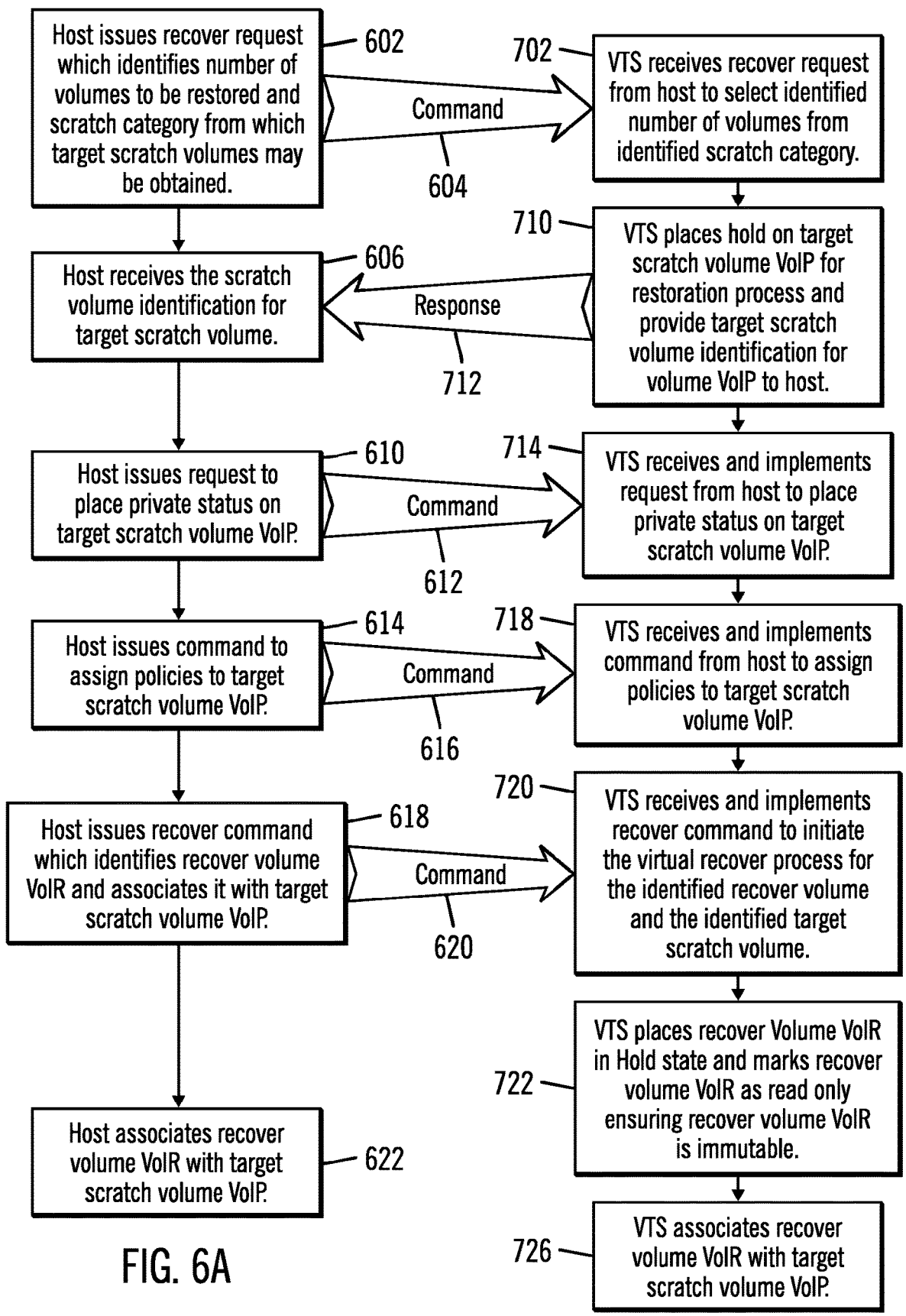
FIG. 6A illustrates a more detailed embodiment of operations of the virtual recovery process of FIG. 5A.

FIG. 5A depicts one embodiment of a virtual recovery process for a recover volume VolR which is virtually recovered to a target scratch volume VolP in this example. The virtual recovery process of FIG. 5A is also referred to herein as a virtual restoration process. FIG. 6A depicts a more detailed embodiment of the virtual recovery process depicted in FIG. 5A. As explained in greater detail in connection with FIGS. 5A and 6A, the virtual recovery process of FIG. 5A includes a mapping process 504 (FIG. 5A) which maps the target scratch volume VolP to the recover volume VolR. In one aspect of volume recovery in accordance with the present description, upon completion of the virtual recovery depicted in FIG. 5A, the recovery of volume VolR may be considered complete as long as the host 100 does not need to access the data of the recover volume VolR.

Figure 5B:
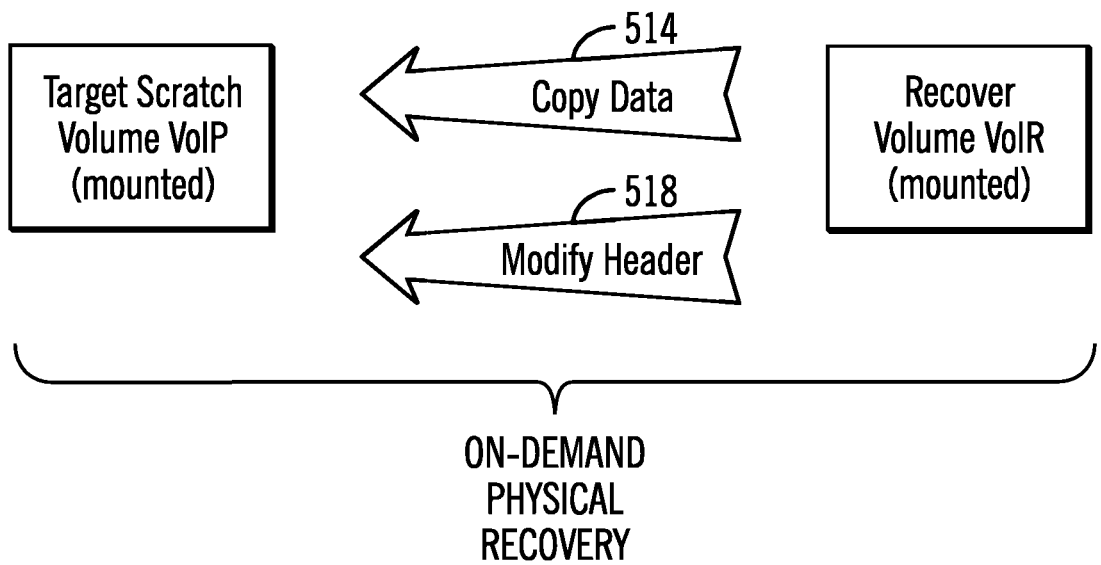
FIG. 5B illustrates an embodiment of operations of a physical restoration or recovery process employing data storage volume recovery management in accordance with the present description.

By comparison, FIG. 5B depicts one example of a physical recovery process in accordance with the present description in the event that the host 100 needs to actually access the data of the recover volume VolR for purposes other than recovery. The physical recovery process of FIG. 5B is also referred to herein as a physical restoration process. As explained in greater detail below, in response to a request by a host 100 for user data stored on the recover volume VolR, the physical restoration (FIG. 5B) of the recover volume VolR is performed using the target scratch volume VolP which has been mapped to the recover volume VolR by the virtual recovery process of FIG. 5A. The physical restoration includes on-demand copying of data (as represented by arrow 514) to the target private volume VolP from the recover volume VolR to which the target scratch volume VolP is mapped by the virtual restoration of FIG. 5A, and also includes on-demand modifying of data headers (as represented by arrow 518) to relabel copied data as VolP data instead of VolR data. In this manner, accessing and copying data from the recover volume VolR is deferred as on-demand, that is, until access to the data is requested by the host. Further, the data relabeling is also an on-demand process in which header modification is also deferred until access to the data is requested by the host. In addition to the tape label, other metadata stored internally within the tape volume identifies the VOLSER of the volume. Thus to re-label data from a tape volume due to a VOLSER change, any and all file names and metadata internal within files which reference the VOLSER are also updated as a part of the re-labeling process. As a result, any known metadata read from the recover volume VolR for storage in the target private volume VolP inside the volume that directly references the source volume serial number (VOLSER) is updated for storage in the target volume as part of the physical restore.

In one embodiment, the mapping process 504 of the virtual recovery process of FIG. 5A is achieved by configuring metadata maintained by the host and associated with the target private volume VolP so that a host 100 treats the target private volume VolP as if it were the recover volume VolR. In addition, the VTS of the storage system configures metadata maintained by the VTS and associated with the target scratch volume VolP to point to the recover volume VolR in case the host 100 should later need to actually access data within the recover volume VolR once the virtual recovery process of FIG. 5A is complete.

In accordance with one aspect of volume recovery in accordance with the present description, it is appreciated that as long as the host 100 does not need to access data within the recover volume VolR, the virtual recovery process depicted in FIG. 5A obviates the need to actually transfer data from the recover volume VolR to the scratch volume VolP until the host 100 actually needs to access the data of recover volume R for application purposes rather than merely recovery purposes. Hence, the target scratch volume VolP and the recover volume VolR are depicted in FIG. 5A as unmounted because actual data transfer is not needed for the virtual recovery process of FIG. 5A. Because the virtual recovery process of FIG. 5A is directed to configuring metadata associated with the target scratch volume VolP instead of copying data from the recover volume VolR to the target scratch VolP, the virtual recovery process of FIG. 5A may be completed quickly as compared to an actual data transfer from volume VolR to volume VolP.

By comparison, there are previously known recovery methods which require the volume to be recovered to be physically copied or moved into a scratch volume before it is considered 'restored'. Having to move (or copy) the data has several disadvantages: Moving (or copying) the data can be time consuming since tape volumes can be quite large (typically 4 GB or larger in size). Also, if that data is archival data that may never be accessed, except under extreme situations, then time is being consumed to copy the data and store it to the new VOLSER. Typically, a user will also be monitoring the process to ensure it completes, so if a single, large volume takes an hour to process, someone is monitoring it to completion. To move (copy) data also requires system resources such as memory, CPU and disk utilization. It also requires usage of a tape device if implemented by a VTS or by a physical tape library. These tape devices would be tied up doing this work instead of more important, production work. If the data resides only on a system that incurs added cost when being read (such as a cloud storage system), having to read that data can be costly.

Still further, the archive instance may in some circumstances be viewed as legally held and such that modification or replacement is not legally permitted and are treated as "read-only." Other examples of circumstances which may prevent previously known recovery methods include volumes having a strict retention or media policy such as WORM (Write Once, Read Many).

By comparison, virtual recovery in accordance with the present description provides an ability for users to restore an older version of a volume to a scratch volume without any physical data movement. Instead of moving the actual data, only the metadata that will map the new scratch volume to the old version of a volume needs to be changed. Modifying the metadata for the volume typically only needs subseconds to complete, and may require only a negligible amount of resources compared to that typically used for actual data copying of large volumes. Moreover, virtual recovery in accordance with the present description can eliminate added costs if the recover volume is stored in a system such as a cloud system which charges by the read operation. Since a physical recovery in which data is physically copied and volume header data modified may be deferred until the host actually needs the data and thus deferred until the host mounts the volume, cloud charges for reading the data may be avoided entirely in the recovery process if the host doesn't ever need to actually read the data.

Blocks 602-622 of FIG. 6A depict a more detailed example of the virtual recovery process of FIG. 5A from the viewpoint of a host 100. Blocks 630-650 of FIG. 6B depict a more detailed example of the physical recovery process of FIG. 5B from the viewpoint of a host 100.

In the example of FIG. 6A, the recovery manager 123h of the host 100 initiates virtual recovery (FIG. 5A) by issuing (block 602, FIG. 6A) a command (as represented by the arrow 604 labeled "command") to a tape library of the VTS storage system in which the command requests restoration of volumes. In one embodiment, the command indicates how many volumes the host 100 needs to recover and from what scratch category the target volumes may be taken. Such a command or request may be issued manually or automatically through a suitable interface such as a management interface. In one embodiment, the request may be in a format such as LIBRARY REQUEST, library-name, RECOVER, NUM, N, C where the name of the command is "LIBRARY REQUEST" and the parameter "library-name" identifies the target library to which the command is directed, the parameter "RECOVER" identifies the action to be taken, the parameters "NUM, N" identify how many volumes are to be recovered, and the parameter "C" identifies the scratch category from which the target scratch volumes may be taken. Thus, the request LIBRARY REQUEST, library-name, RECOVER, NUM, 1, 0002 requests restoration of a single logical volume using scratch category 0002 as the target category. It is appreciated that other command or request formats names, and parameters may be used, depending upon the particular application.

Figure 6B:
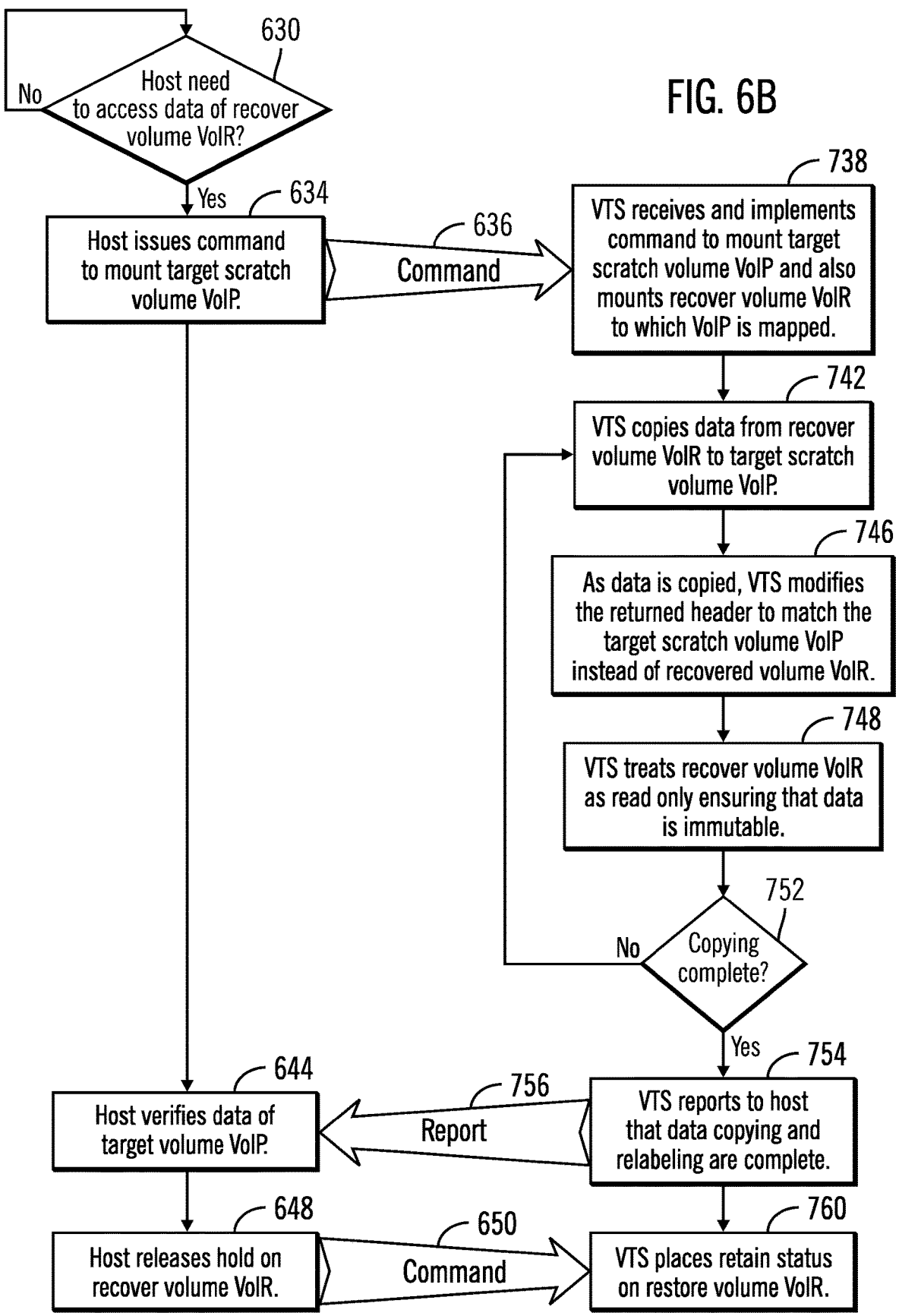
FIG. 6B illustrates a more detailed embodiment of operations of the physical recovery process of FIG. 5B.

In the illustrated embodiment, blocks 702-726 of FIG. 6A depict one example of the virtual recovery process of FIG. 5A from the viewpoint of a tape library of a storage server 104 such as a VTS (virtual tape server) 104, for example, and blocks 738-760 of FIG. 6B depict one example of the physical recovery process of FIG. 5B from the viewpoint of the tape library of the VTS storage server 104 of the storage system. In the example of FIG. 6A, in response to the command 604 of block 602 (FIG. 6A) requesting initiation of the virtual recovery process for the specified number of volumes to be obtained from the specified scratch category, the recovery manager 123 of the VTS 104 receives (block 702, FIG. 6A) the command and selects (block 702, FIG. 6A) the particular volume or volumes from the identified scratch category and places them in a special hold category.

FIG. 7A depicts in tabular form, metadata maintained by the tape library of the VTS 104 of the storage device in a suitable database referred to herein as the tape library catalog. The example of FIG. 7A depicts three entries for three volumes, volume serial no. L00000, version V1, volume serial no. L00000, version V2 and scratch volume S99999 which is categorized as being in scratch category 0002. Although the VTS catalog is depicted as having three entries for simplicity sake, it is appreciated that a VTS tape library catalog may have thousands or more entries, depending upon the particular application.

In response to the command LIBRARY REQUEST, library-name, RECOVER, NUM, 1, 0002 from the host, the recovery manager 123 of the VTS 104 may select (block 702, FIG. 6A) for example, scratch volume S99999 (FIG. 7A) of the general scratch category 0002 for the virtual recovery process depicted in FIG. 5A. If so, the VTS 104 selects the scratch volume S99999 from general scratch category 0002 and temporarily places (block 710, FIG. 6A) the volume in special hold category such as category Y000 for example, as depicted in FIG. 7B. In addition, the recovery manager 123 of the VTS 104 issues a response as represented by the arrow 712 to the host, informing the recovery manager 123h of the host 100 that the scratch volume having volume serial No. S99999 has been obtained from the designated scratch category 0002 in response to the request issued by the host.

Having received (block 606, FIG. 6A) the identification of the requested scratch volume as having volume serial No. S99999, the recovery manager 123h of the host 100 issues (block 610, FIG. 6A) another command as presented by the arrow 612, to the VTS 104 requesting that the target scratch volume having volume serial No. S99999 be placed in a private category to ensure that it is not used by other hosts or other host processes for another purpose. As explained below, the scratch volume having volume serial No. S99999 will be used as the target scratch volume as represented by the volume VolP (FIG. 5A) for the virtual recovery process depicted in FIG. 5A. In response to the command 612, the recovery manager 123 of the VTS 104 places (block 718, FIG. 6A) the scratch volume having volume serial No. S99999 in a private category such as category C000 as indicated in FIG. 7C.

Having reserved the scratch volume having volume serial No. S99999 for its own private use, the recovery manager 123h of the host 100 issues (block 614, FIG. 6A) to the VTS 104, a command as represented by the arrow 616, to assign one or more retention policies to the scratch volume having volume serial No. S99999. These policies define how long a volume is to be retained for example before it may be discarded.

For example, the host 100 may use a known command such as the existing MVS LIBRARY LMPOLICY command to assign (block 614, FIG. 6A) policies to the "n" (now private) requested volumes that will be used in the recovery. In this example, the LIBRARY LMPOLICY command is used to assign retention policies to scratch volume S99999 with the following parameters: LIBRARY LMPOLICY, S99999, SG=SGRECOVER, MC=MCRECOVER, SC=SCRECOVER, DC=DCRECOVER.

The policies established at the tape library of the VTS 104 could be existing policies used for their other data or it could be new policies for the purpose of the recovery. In response to receipt of the policy assignment command 616, the VTS 104 assigns (block 718) the policy or policies indicated by the command 616 to the scratch volume having volume Serial No. S99999. The assignment of policies to the scratch volume having volume Serial No. S99999 is represented in FIG. 7D as the scratch volume having volume Serial No. S99999 being assigned to volume category C000. In this manner, policy actions are associated (block 718, FIG. 6A) with the specified policy names at the tape library of the VTS.

Having reserved the scratch volume having volume serial No. S99999 for its own private use and having assigned the appropriate retention policy to that scratch volume, the recovery manager 123h of the host 100 issues (block 618, FIG. 6A) a recover command to the VTS 104 as represented by the arrow 620. The recover command referred to herein as MVS LIBRARY RECOVER identifies the volume selected to be recovered and the volume selected to be the target scratch volume. For example, the MVS LIBRARY RECOVER command may have parameters specified as following: LIBRARY REQUEST, library-name, RECOVER, S99999, L00000, V2.

Thus, the recover command 620 in this example identifies the private scratch volume S99999 which is represented in the third entry of the VTS catalog (FIG. 7D) in this example, as the target scratch volume. Accordingly, in this example, the private scratch volume S99999 has been selected by the recover command 620 to be the target scratch volume VolP in the virtual recovery process of FIG. 5A.

The recover command 620 in this example also identifies, the recover volume as volume Serial No. L00000, version V2, categorized in volume category C000 as represented by the second entry of the VTS tape library catalog of FIG. 7D. Accordingly, in this example, the recover volume L00000, version V2, has been selected to be the recover volume VolR in the virtual recovery process of FIG. 5A.

In some embodiments, the virtual recovery process of FIG. 5A may be initiated by a user through a suitable user interface. Once initiated, the host 100 can, in one embodiment, issue the commands of FIG. 6A automatically. In other embodiments, one or more of the commands described in connection with FIG. 6A may be issued by a user manually from the host 100 through a suitable user interface for the host In response to the recover command 620 issued by the host 100 which identifies the recover volume VolR and the target scratch volume VolP for the virtual recovery process (FIG. 5A), the recovery manager 123 of the VTS 104 implements (block 720, FIG. 6A) the virtual recovery process depicted in FIG. 5A to virtually recover the volume VolR using the target scratch volume VolP. In one embodiment of the virtual recovery process, the VTS 104 changes (block 722, FIG. 6A) the state of the recover volume VolR (volume L00000, V2, in this example) to the Hold state as indicated in FIG. 7D for the VTS tape library catalog, from the prior Retain state as indicated in FIG. 7C for the VTS tape library catalog.

In this example, in the Hold state, the recover volume VolR is marked (block 722, FIG. 6A) as read-only to ensure that any previous properties are preserved and that the recover volume VolR is not modified by the recover process, that is, that the recover volume VolR is immutable. The target scratch volume VolP (volume S99999 in this example) can also be treated as immutable or as a read/write volume, depending upon client preference.

Thus, as a part of the virtual recovery of FIG. 5A, the host 100 can bypass entirely any mounting of either the recover volume VolR or the private target scratch volume VolP for the virtual recovery process, leaving the tape or other storage drives of the storage server free for other usage during the virtual recovery process. As long as the host 100 does not encounter an actual need to access the data of the recover volume VolR, both the recover volume VolR and the target scratch volume VolP may remain unmounted. However, should the need arise to access the data of the recover volume VolR, the physical recovery of FIG. 5B may be implemented as described below.

In another aspect of the virtual recovery process, and in further response to receipt of recover command 620 (block 722, FIG. 6A), the recovery manager 123 of the VTS 104 associates (block 726, FIG. 6A) the recover volume VolR (volume L00000, V2, in this example) with the target scratch volume VolP (volume S99999, version V1, in this example) for the virtual recovery process. In one embodiment, the VTS 104 associating the recover volume VolR and the target scratch volume VolP includes mapping the target scratch volume VolP to the recover volume VolR as represented by the arrow 504 labeled "mapping" in FIG. 5A. For the illustrated embodiment, the mapping may be accomplished by changing metadata for the target scratch volume VolP (S99999 in this example) to point to the data stored on the recover volume VolR (L00000, V2, in this example). For example, metadata in the form of a tape library catalog entry of the VTS 104 may be configured as depicted in the mapping catalog entry represented by the table of FIG. 8A, to map the target scratch volume VolP to the recover volume VolR so that the metadata represented by the VTS mapping catalog entry of FIG. 8A and associated with the target scratch volume VolP points to the recover volume VolR.

As explained in greater detail in connection with a physical recovery such as that depicted in FIG. 5B, the mapping of the target scratch volume VolP to the recover volume VolR as indicated in FIGS. 5A and 8A may be utilized in a later physical recovery to locate and read the data of the recover volume VolP should the host 100 need to access the data of the recover volume VolR after the virtual recovery is completed. However, the virtual recovery itself of the illustrated embodiment does not require either the recover volume VolR or the target scratch volume VolP to be mounted and read or written to. Instead, the mapping (FIG. 5A) as represented by the arrow 504 in FIG. 5A and the VTS catalog entry of FIG. 8A is accomplished by configuring metadata associated with the volumes VolR and VolP without the need for mounting either of the volumes. Thus, a virtual recovery may be accomplished without reading from any backend storage device, such as physical tape drive or the cloud. Also any header information inside the data stored on a volume need not be modified to complete the virtual recovery.

By comparison, in various known recovery methods, the recovery requires the recover volume to be read from an external storage device, the read data modified to indicate a different VOLSER, and written back to the storage device. In contrast, as noted above, in the virtual recovery of FIGS. 5A, 6A, and 8A, the data stored on the recover volume VolR (L00000 V2 in this example) can remain unaccessed and thus can remain unmounted, unread and not written to throughout the virtual recovery.

The host 100 having issued (block 618, FIG. 6A) the recover command to the VTS 104 as represented by the arrow 620, identifying the volume VolR selected to be recovered and the volume VolP selected to be the target scratch volume, the recovery manager 123*h* of the host 100 also associates (block 622, FIG. 6A) the recover volume VolR (volume L00000, v2, in this example) with the target scratch volume VolP (volume S99999, version V1, in this example) for the virtual recovery process. In one embodiment, the host 100 associating the recover volume VolR and the target scratch volume VolP includes mapping the target scratch volume VolP to the recover volume VolR. The host 100 mapping the target scratch volume VolP to the recover volume VolR is also a component of the mapping represented by the arrow 504 labeled "mapping" in FIG. 5A.

In the illustrated embodiment, the mapping by the host 100 may be accomplished by changing metadata for the target scratch volume VolP (S99999 in this example) to reference the target scratch volume VolP as if it were the recover volume VolR (L00000 in this example). For example, metadata in the form of a mapping catalog entry of the host 100 may be configured as depicted in the host catalog entry represented by the table of FIG. 8B, to reference the target scratch volume VolP as if it already contained the data currently stored in the recover volume VolR. In one embodiment, references to the VOLSER of the recover volume VolR (volume L00000 in this example) are replaced by the VOLSER of the target scratch volume VolP (S99999 in this example). Thus, should the host need, for example, to locate the data sets currently stored within the recover volume VolR, references to the recover volume VolR are replaced by references to the target scratch volume VolP as shown in FIG. 8B. Although the mapping metadata is described as a catalog entry in the illustrated embodiment, it is appreciated that such mapping metadata may be in other forms such as data structures within applications, for example, depending upon the particular application.

As explained in greater detail in connection with a physical recovery such as that depicted in FIG. 5B, the mapping of the target scratch volume VolP to the recover volume VolR as indicated in FIGS. 5A, 8A, and 8B may be utilized in a later physical recovery so that the host 100 mounts the target scratch volume VolP should the host 100 need to access the data of the recover volume VolR after the virtual recovery is completed. However, as noted above, the virtual recovery itself of the illustrated embodiment does not require either the recover volume VolR or the target scratch volume VolP to be mounted or read from or written to. Instead, the mapping (FIG. 5A) as represented by the arrow 504 in FIG. 5A, and by the VTS mapping catalog entry of FIG. 8A and the host mapping catalog entry of FIG. 8B, are accomplished respectively, by the VTS 104 and the host 100 configuring metadata associated with the volumes VolR and VolP without the need for mounting either of the volumes. Thus, a virtual recovery may be accomplished without reading from any backend storage device, such as physical tape drive or the cloud. Also any header information inside the data stored on a volume need not be modified to complete the virtual recovery.

By comparison, in various known recovery methods, the recovery requires the recover volume to be read from an external storage device, the read data modified to indicate a different VOLSER, and written back to the storage device. In contrast, as noted above, in the virtual recovery of FIGS. 5A, 6A, 8A and 8B, the data stored on the recover volume VolR (L00000 V2 in this example) can remain unaccessed and thus can be remain unread and unwritten to (immutable) throughout the virtual recovery.

As noted above, FIG. 5B depicts one example of a physical recovery process in accordance with the present description in the event that the host 100 needs to actually access the data of the recover volume VolR for purposes other than recovery. FIG. 6B depicts a more detailed example of the physical recovery process of FIG. 5A. In this embodiment, should the host 100 determine (block 630, FIG. 6B) that it needs to actually access the data of the recover volume VolR which has been mapped (FIG. 8B) by the virtual recovery process as described above to the target scratch volume VolR as if it were contained in the target volume VolP, the recovery manager 123*h* of the host 100 issues (block 634, FIG. 6B) a command to the VTS 104 to mount the target scratch volume VolP mapped to the recover VolR by the host 100. At this point, the target scratch volume VolP is referred to as the target private volume VolP instead of a scratch volume. In this manner, the host 100 treats the target private volume VolP (S99999 in this example) as if it were the recover volume VolR (L00000, V2, in this example) as described above. The command to the VTS 104 to mount the target private volume VolP is represented in FIG. 6B by the arrow 636 labeled as "command" and initiates the physical recovery process of FIG. 5B using the target private volume VolP for the recover volume VolR.

In response to the host 100 command 636 to mount the target private volume VolP, the recovery manager 123 of the VTS 104 mounts (block 738, FIG. 6B) the target private volume VolP (S99999 in this example) but also mounts (block 738, FIG. 6B) the recover volume VolR (L00000, V2 in this example) to which the target scratch volume VolP was mapped by the VTS 104 in the virtual recovery process described above. In this example, the target scratch volume VolP has been mapped by the VTS 104 configuring metadata associated with the target private volume VolP to point to the recover volume VolR. The VTS 104 also updates the VTS tape library catalog to indicate the "Mount" state of the target private volume VolP as represented in FIG. 7E.

Figure 9A:
FIG. 9A depicts an embodiment of data read from a recover volume.

Using the mapping of the target private volume VolP (S99999 in this example) to the recover volume VolR (L00000, V2, in this example), the data of the mounted recover volume VolR is accessed and copied (block 742) by the recovery manager 123 to the target private volume VolP as represented by the arrow 514 (FIG. 5B) which is labeled "Copy Data." FIG. 9A shows in schematic form an example of data read from the mounted recover volume VolR, which includes a header portion 902 having metadata which identifies the source of the data as the recover volume VolR. The header portion 902 may include other metadata describing other characteristics of the data read from the recover volume VolR, depending upon the particular application.

The remainder of the data read from the recover volume VolR (L00000, V2, in this example) is referred to in FIG. 9A as non-header data 904 and includes the user data stored on the recover volume VolR and may include other types of data, depending upon the particular application. The non-header data 904 is accessed and copied (block 742, FIG. 6B) from the mounted recover volume VolR to the target private volume VolP (S99999 in this example) as indicated in FIG. 9B and as represented by the arrow 514 (FIG. 5B) which is labeled "Copy Data."

Figure 9B:
FIG. 9B depicts an embodiment of data stored in a target private volume.

As the non-header data 904 is copied to the target private volume VolP (S99999 in this example), the header data 902 read from the recover volume VolR is replaced (block 746, FIG. 6B) by replacement header 906 (FIG. 9B) which is stored with the data 904 on the target private volume VolP as shown in FIG. 9B and as represented by the arrow 518 (FIG. 5B) labeled "Modify Header" in FIG. 5B. In this manner, the data read from the recover volume VolR is relabeled as it is stored on the target private volume VolP to indicate the source of the data as the target private volume VolP (S99999 in this example) in subsequent reads of that data from the volume VolP. The recovered volume can now be accessed as volume Serial No. S99999 in all uses.

Moreover, accessing and copying data from the recover volume VolR is deferred until access to the data is requested by the host. Further, data source relabeling is also an on-demand process in which header modification for the copy operation directed to the target private volume VolP is also deferred until access to the data of the recover volume VolR is requested by the host 100 by requesting mounting of the target private volume VolP. In this embodiment, the recover volume VolR can remain immutable, that is, unchanged (block 748, FIG. 6B) over the course of the physical recovery as well as the virtual recovery as described above. Thus the recover volume VolR may still be used as the source if future reads are required from the external storage device cloud or tape.

Upon completion (block 752, FIG. 6B) of the copying and relabeling of data from the recover volume VolR to the target volume VolP, the recovery manager 123 of the VTS 104 reports (block 754, FIG. 6B) to the host 100 that the physical recovery of the recover volume VolR to target volume VolP (S99999 in this example) is complete as represented by the arrow 756 (FIG. 6B) labeled "Report." The completion of data copying and relabeling may be referred to as "mount complete." In addition, the VTS 104 updates the VTS tape library catalog to indicate the active status of the target volume VolP as shown in FIG. 7F.

In response, in this embodiment, the recovery manager 123h of the host 100 verifies (block 644, FIG. 6B) the data of the target volume VolP and issues a command to the VTS 104 as represented by the arrow 650 labeled "command," to release (block 648, FIG. 6B) the Hold status on the recover volume VolR. In response the VTS 104 updates the status of the recover volume VolR in the VTS tape library catalog to release the "Hold" status and restore the "Retain" status as shown in FIG. 7G.

In the illustrated embodiment, once the virtual recovery of the data from the recover volume VolR (L00000 V2 in this example) to the target private volume VolP (S99999, V1 in this example) has completed, the host need not keep track of any mapping of the private volume VolP to the recover volume VolR. As far as the host knows, the data is fully recovered into S99999. If the host wants to read the data at this point it will just do a regular library mount (referred to as a "LUM" in the illustrated embodiment) of the target private volume VolP to read the recovery data as it would any other volume. If the physical recovery has not yet occurred, the VTS 104 which maintains the mapping information, proceeds to copy the data and modify the headers for the physical recovery from the recover volume VolR to the target private volume VolP as described in connection with FIG. 5B.

In another aspect of data storage volume recovery management in accordance with the present description, the virtual recovery process of FIGS. 5A and 6A may be used to quickly and efficiently import volumes from another source which may have a different or conflicting volume serial numbering scheme or convention. In one embodiment, each of the volumes to be imported such as a volume VolR (FIG. 5A), may be mapped or remapped (as represented by arrow 504, FIG. 6A) to a new target private volume VolP wherein each such volume VolP has a VOLSER which conforms to the existing volume serial number convention of the host 100 or storage server 104 of the target data storage system for example. Thus, each of the volumes VolR (FIG. 5A) to be imported may be mapped or remapped to new VOLSERs which do not match existing active VOLSERS or otherwise conflict with existing VOLSERS of the host or storage server, for example of a target data storage system. In addition, the volumes VolR being imported may be mapped or remapped to VOLSERs of target private volumes VolP which conform to and thereby maintain existing volume serial number range conventions.

It is appreciated that volumes to be imported to a target VTS, for example, may number in the hundreds, thousands, millions or more, depending upon the particular application. The virtual recovery process of the illustrated embodiment, allows large numbers of volumes to be rapidly imported to a target VTS without mounting or otherwise accessing any of the volumes being imported using the virtual recovery process. As a result, the volumes being imported may be hardened to maintain the validity of their contents knowing each imported volume can remain immutable and only relabeled on-demand as part of any future recall request of a later physical recovery. For example, for legal reasons, the state of the data at import time may require it to remain immutable to maintain a consistent point of workload acquisition. A virtual recovery process of the illustrated embodiment permits importation of volumes without volume serial (VOLSER) conflict, without needing to access each instance and without needing to modify the source instance. Should a need arise to access data of an imported volume, an on-demand physical recovery of the imported volume may be performed as described above in connection with FIGS. 5B and 6B.

In yet another aspect, storage volume recovery in accordance with the present description may be applied recursively, to recover a volume as many times as needed since the recover volume may remain immutable and thus unchanged by the recover process of the illustrated embodiment. Thus, after the recover volume VolR has been restored to the target private volume VolP as described above, should the VolP be deleted and the host subsequently request recovery of the volume VolP or the recover volume VolR again, the virtual recovery process discussed above may be repeated, recovering the recover volume VolR to a new target scratch volume such as target volume VolP1, for example. The new target volume VolP1 may be mapped in a virtual recovery directly to the recover volume VolR instead of the deleted volume VolP since the recover volume VolR is immutable in this example and thus still contains the recover data as the time of the second virtual recovery. If needed a physical recovery may subsequently be performed transferring and relabeling data from the recover volume VolR to the new target volume VolP1 as described above in connection with the first target volume VolP.

Should the target volume VolP1 then be deleted and the host subsequently request recovery of the volume VolP1 or the recover volume VolR again, the virtual recovery process discussed above in connection with target volumes VolP and VolP1 may be repeated once again, recovering the recover volume VolR to yet another new target scratch volume such as target volume VolP2, for example. Thus, the new target volume VolP2 may be mapped in a virtual recovery directly to the recover volume VolR instead of the deleted volume VolP1 since the recover volume VolR is immutable in this example and thus still contains the recover data as of the third virtual recovery. If needed a physical recovery may be performed transferring and relabeling data from the recover volume VolR to the latest new target volume VolP2 as described above in connection with the earlier target volumes VolP and VolP1. Thus, volume recovery management in accordance with the present description permits a volume to be recovered indefinitely and to remain immutable indefinitely.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
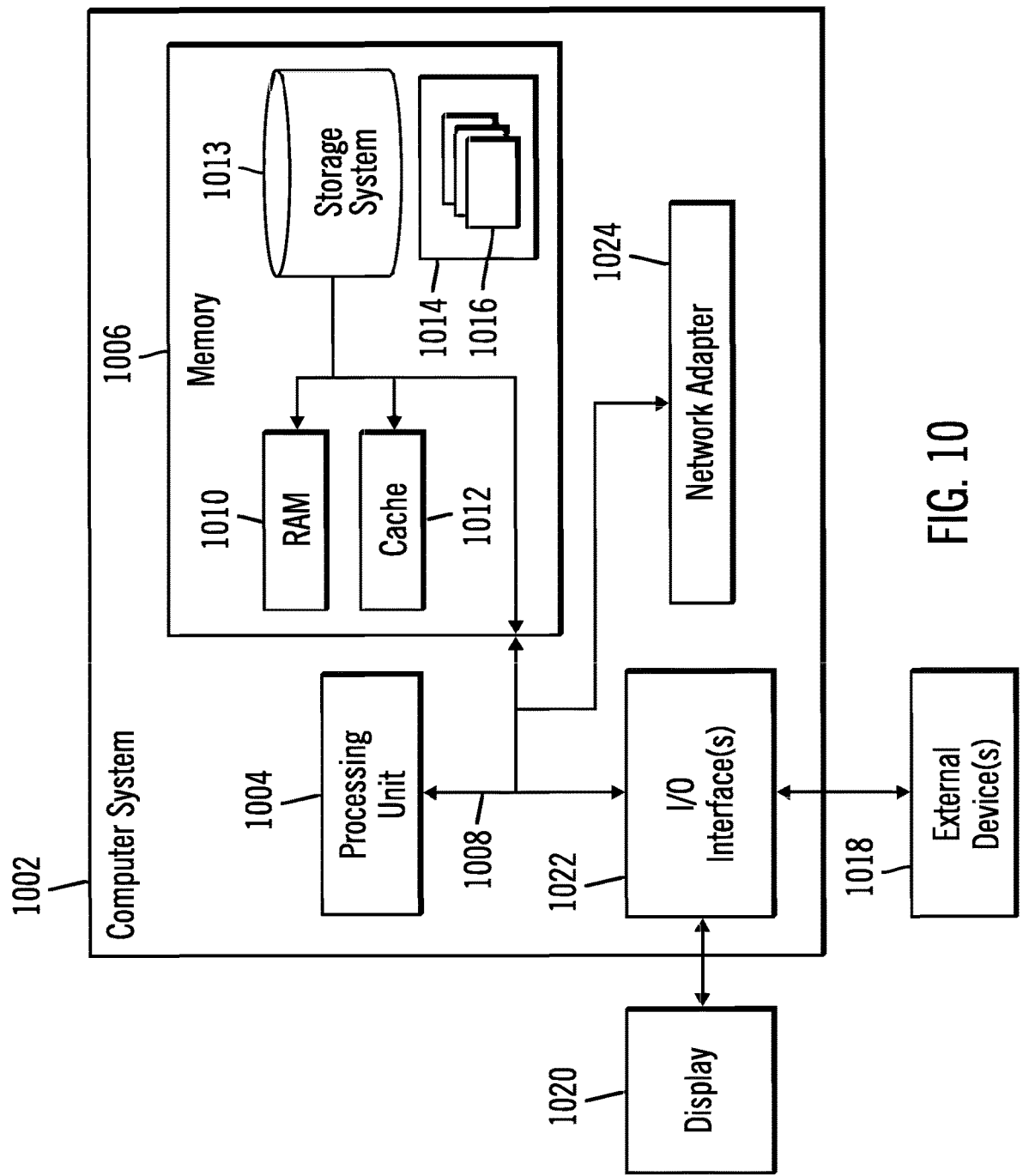
FIG. 10 illustrates a computing environment in which the components of the figures may be implemented.

The computational components of the figures may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for restoring a volume of data stored in storage, wherein the computer program product comprises a computer readable storage medium having program instructions executable by a processor to cause operations, the operations comprising:
performing a first virtual restoration of a first volume of user data stored in the storage using a second volume different from the first volume, including configuring metadata associated with the second volume to map the second volume to the first volume so that the second volume is a virtual restoration of the first volume such that the second volume lacks physical user data of the first volume wherein the first volume remains unmounted in the storage throughout the virtual restoration of the first volume.

2. The computer program product of claim 1 wherein the operations further comprise:
in response to a request by a host for data stored on the first volume, performing a physical restoration of data of the first volume using the second volume, including transferring data to the second volume from the first volume to which the second volume is mapped by the virtual restoration, and relabeling transferred data as second volume data instead of first volume data so that accessing data of the first volume is deferred until access to the data is requested by the host and wherein modification of data on the first volume in association with restoration of the first volume is avoided during virtual and physical restoration of the first volume.

3. The computer program product of claim 2 wherein the transferring data to the second volume from the first volume includes in response to receiving a request by the host to mount the second volume on a storage drive and in response to the request:
mounting the second volume on a storage drive of a virtual tape server;
mounting the first volume on a storage drive; and
copying data of the first volume mapped to the second volume by the metadata for the second volume so that copying of data from the first volume in association with restoration of the first volume using the second volume, is deferred until the physical restoration of the second volume.

4. The computer program product of claim 3 wherein relabeling transferred data as second volume data instead of first volume data includes modifying header data read from the first volume as data is stored on the second volume to identify data copied from the first volume as being data for the second volume instead of the first volume and so that modifying header data read from the first volume is deferred until access to the data is requested by the host.

5. The computer program product of claim 4 wherein the first volume has a first volume serial number and the second volume has a second serial number different from the first volume serial number, and wherein modifying header data for storing on the second volume during the physical restoration of the first volume includes replacing the first serial number of the first volume in header data, with the second volume serial number of the second volume, as header data and user data are read from the first volume and read data is copied to the second volume.

6. The computer program product of claim 3 wherein the operations further comprise categorizing the first volume as a read-only volume prior to mounting the first volume to prevent modification of the first volume by the restoration of the first volume during both the virtual restoration and physical restoration of the first volume.

7. The computer program product of claim 2 wherein prior to initiation of the virtual restoration of the first volume, the first volume is categorized in a retain category in which volumes are retained for a period of time after being designated for deletion, the virtual restoration of the first volume of data stored in storage further including re-categorizing the first volume in a hold category in which modification of volumes is prevented, and further in response to completion of the transferring data from the first volume to the second volume during the physical restoration of the first volume, re-categorizing the first volume from the hold category back to the retain category and wherein modification of the first volume by the restoration of the first volume is avoided during both the virtual restoration and the physical restoration of the first volume.

8. The computer program product of claim 1 wherein the operations further comprise assigning at least one policy to the second volume in which the policy defines parameters for at least one of how long to keep a volume and a permitted number of versions of the volume.

9. The computer program product of claim 1 wherein the operations further comprise importing a third volume to the storage including performing a virtual restoration of the third volume using a fourth volume having a volume serial number which conforms to a volume serial numbering convention of the storage, the virtual restoration of the third volume including configuring metadata associated with the fourth volume to map the fourth volume to the third volume as a virtual restoration of the third volume.

10. The computer program product of claim 1 wherein the operations further comprise:
deleting the second volume; and
performing a second virtual restoration of the first volume using a third volume, including configuring metadata associated with the third volume to map the third volume to the first volume as a second virtual restoration of the first volume wherein the first volume remains immutable over the course of the first and second virtual restorations of the first volume.

11. The computer program product of claim 1 wherein the first volume is stored in secondary storage coupled to a storage server having primary storage and wherein the first volume remains unmounted in the secondary storage throughout the virtual restoration of the first volume.

12. A system for use with a host and for restoring volumes of data, comprising:
 storage having a plurality of volumes of data;
 a processor; and
 a computer readable storage medium having program instructions that when executed by the processor cause operations, the operations comprising:
 performing a first virtual restoration of a first volume of user data stored in the storage using a second volume different from the first volume, including configuring metadata associated with the second volume to map the second volume to the first volume so that the second volume is a virtual restoration of the first volume such that the second volume lacks physical user data of the first volume wherein the first volume remains unmounted in the storage throughout the virtual restoration of the first volume.

13. The system of claim 12 wherein the operations further comprise:
 in response to a request by a host for data stored on the first volume, performing a physical restoration of data of the first volume using the second volume, including transferring data to the second volume from the first volume to which the second volume is mapped by the virtual restoration, and relabeling transferred data as second volume data instead of first volume data so that accessing data of the first volume is deferred until access to the data is requested by the host and wherein modification of data on the first volume in association with restoration of the first volume is avoided during virtual and physical restoration of the first volume.

14. The system of claim 13 wherein the storage includes a storage drive and a virtual tape server having a storage drive, wherein transferring data to the second volume from the first volume includes receiving a request by the host to mount the second volume on a storage drive and in response to the request:
 mounting the second volume on the storage drive of the virtual tape server;
 mounting the first volume on a storage drive; and
 copying data of the first volume mapped to the second volume by the metadata for the second volume so that copying of data from the first volume in association with restoration of the first volume using the second volume, is deferred until the physical restoration of the second volume;
 wherein relabeling transferred data as second volume data instead of first volume data includes modifying header data read from the first volume as data is stored on the second volume to identify data copied from the first volume as being data for the second volume instead of the first volume and so that modifying header data read from the first volume is deferred until access to the data is requested by the host;
 wherein the first volume has a first volume serial number and the second volume has a second serial number different from the first volume serial number, and wherein modifying header data for storing on the second volume during the physical restoration of the first volume includes replacing the first serial number of the first volume in header data, with the second volume serial number of the second volume, as header data and user data are read from the first volume and read data is copied to the second volume; and
 wherein the operations further comprise categorizing the first volume as a read-only volume prior to mounting the first volume to prevent modification of the first volume by the restoration of the first volume during both the virtual restoration and physical restoration of the first volume.

15. The system of claim 13 wherein the operations further comprise prior to initiation of the virtual restoration of the first volume, categorizing the first volume in a retain category in which volumes are retained for a period of time after being designated for deletion; and
 wherein the virtual restoration of the first volume of data stored in storage further includes re-categorizing the first volume in a hold category in which modification of volumes is prevented, and further in response to completion of the transferring data from the first volume to the second volume during the physical restoration of the first volume, re-categorizing the first volume from the hold category back to the retain category and wherein modification of the first volume by the restoration of the first volume is avoided during both the virtual restoration and the physical restoration of the first volume.

16. The system of claim 12 wherein the operations further comprise assigning at least one policy to the second volume in which the policy defines parameters for at least one of how long to keep a volume and a permitted number of versions of the volume.

17. The system of claim 12 wherein the operations further comprise importing a third volume to the storage including performing a virtual restoration of the third volume using a fourth volume having a volume serial number which conforms to a volume serial numbering convention of the storage, the virtual restoration of the third volume including configuring metadata associated with the fourth volume to map the fourth volume to the third volume as a virtual restoration of the third volume.

18. The system of claim 12 wherein the operations further comprise:
 deleting the second volume; and
 performing a second virtual restoration of the first volume using a third volume, including configuring metadata associated with the third volume to map the third volume to the first volume as a second virtual restoration of the first volume wherein the first volume remains immutable over the course of the first and second virtual restorations of the first volume.

19. The system of claim 12 wherein the storage includes a storage server having primary storage and secondary storage and wherein the first volume is stored in the secondary storage and wherein the first volume remains unmounted in the secondary storage throughout the virtual restoration of the first volume.

20. A method, comprising:
 performing a first virtual restoration of a first volume of data stored in storage using a second volume, including configuring metadata associated with the second volume to map the second volume to the first volume as a virtual restoration of the first volume; and
 in response to a request by a host for data stored on the first volume, performing a physical restoration of data of the first volume using the second volume, including transferring data to the second volume from the first volume to which the second volume is mapped by the virtual restoration, and relabeling transferred data as second volume data instead of first volume data so that accessing data of the first volume is deferred until access to the data is requested by the host and wherein modification of data on the first volume in association with restoration of the first volume is avoided during virtual and physical restoration of the first volume.

21. The method of claim 20 further comprising:
in response to a request by a host for data stored on the first volume, performing a physical restoration of data of the first volume using the second volume, including transferring data to the second volume from the first volume to which the second volume is mapped by the virtual restoration, and relabeling transferred data as second volume data instead of first volume data so that accessing data of the first volume is deferred until access to the data is requested by the host and wherein modification of data on the first volume in association with restoration of the first volume is avoided during virtual and physical restoration of the first volume.

22. The method of claim 20 wherein the transferring data to the second volume from the first volume includes in response to receiving a request by the host to mount the second volume on a storage drive and in response to the request:
mounting the second volume on a storage drive of a virtual tape server;
mounting the first volume on a storage drive; and
copying data of the first volume mapped to the second volume by the metadata for the second volume so that copying of data from the first volume in association with restoration of the first volume using the second volume, is deferred until the physical restoration of the second volume wherein the first volume is stored in secondary storage coupled to a storage server having primary storage and wherein the first volume remains unmounted in the secondary storage throughout the virtual restoration of the first volume; wherein relabeling transferred data as second volume data instead of first volume data includes modifying header data read from the first volume as data is stored on the second volume to identify data copied from the first volume as being data for the second volume instead of the first volume and so that modifying header data read from the first volume is deferred until access to the data is requested by the host; and
wherein the first volume has a first volume serial number and the second volume has a second serial number different from the first volume serial number, and wherein modifying header data for storing on the second volume during the physical restoration of the first volume includes replacing the first serial number of the first volume in header data, with the second volume serial number of the second volume, as header data and user data are read from the first volume and read data is copied to the second volume.

23. The method of claim 22 further comprising categorizing the first volume as a read-only volume prior to mounting the first volume to prevent modification of the first volume by the restoration of the first volume during both the virtual restoration and physical restoration of the first volume;
prior to initiation of the virtual restoration of the first volume, categorizing the first volume in a retain category in which volumes are retained for a period of time after being designated for deletion;
wherein the virtual restoration of the first volume of data stored in storage further includes re-categorizing the first volume in a hold category in which modification of volumes is prevented;
and wherein the method further comprises:
in response to completion of the transferring data from the first volume to the second volume during the physical restoration of the first volume, re-categorizing the first volume from the hold category back to the retain category wherein modification of the first volume by the restoration of the first volume is avoided during both the virtual restoration and the physical restoration of the first volume; and
assigning at least one policy to the second volume in which the policy defines parameters for at least one of how long to keep a volume and a permitted number of versions of the volume.

24. The method of claim 20 further comprising importing a third volume to the storage including performing a virtual restoration of the third volume using a fourth volume having a volume serial number which conforms to a volume serial numbering convention of the storage, the virtual restoration of the third volume including configuring metadata associated with the fourth volume to map the fourth volume to the third volume as a virtual restoration of the third volume.

25. The method of claim 20 further comprising:
deleting the second volume; and
performing a second virtual restoration of the first volume using a third volume, including configuring metadata associated with the third volume to map the third volume to the first volume as a second virtual restoration of the first volume wherein the first volume remains immutable over the course of the first and second virtual restorations of the first volume.

* * * * *